June 15, 1926.
F. HORNQUIST
AUTOMOBILE BUMPER
Filed June 8, 1925
1,588,736
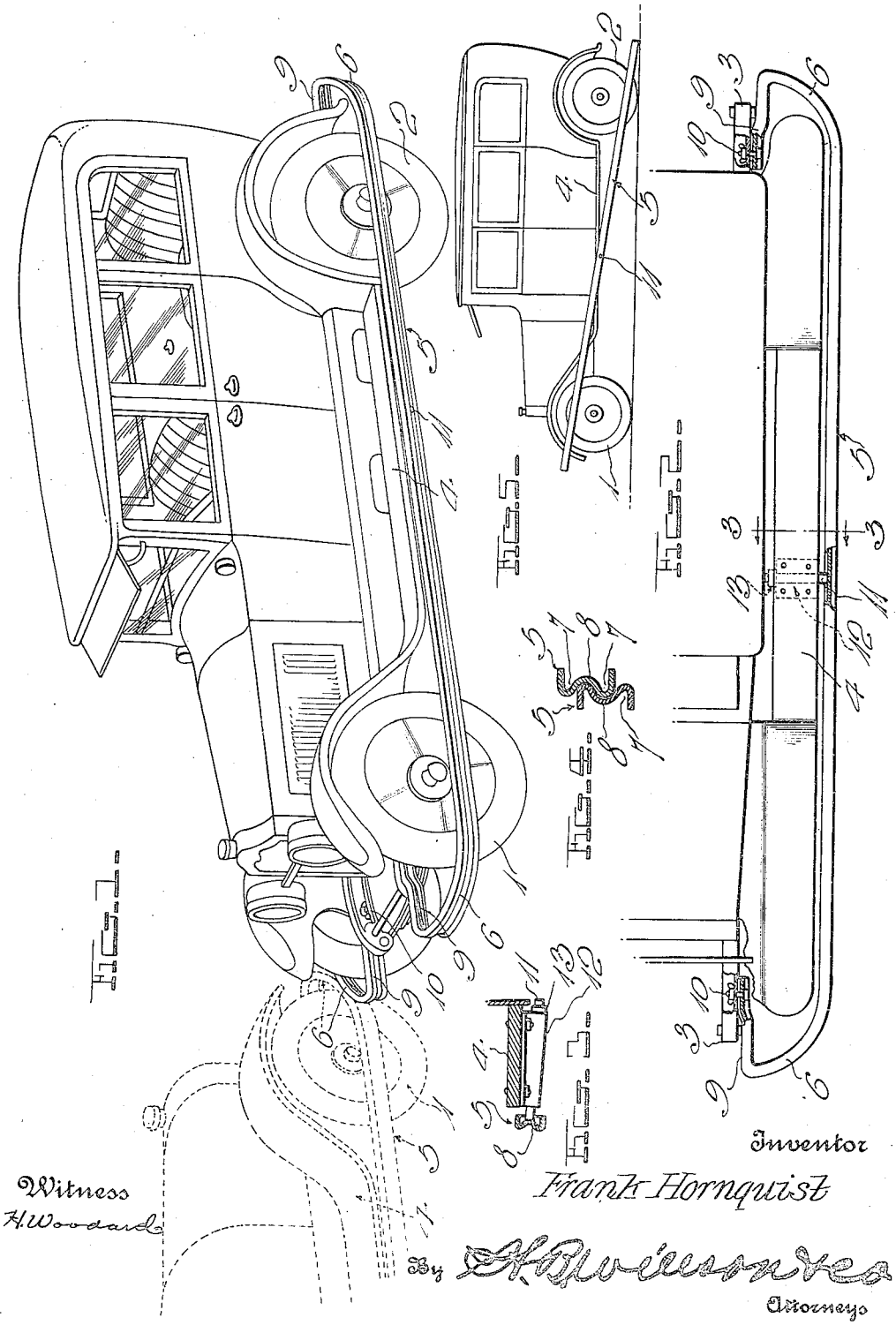
Inventor
Frank Hornquist
Witness
H. Woodard
By
Attorneys Patented June 15, 1926.

1,588,736

UNITED STATES PATENT OFFICE.

FRANK HORNQUIST, OF MOUNT JEWETT, PENNSYLVANIA.

AUTOMOBILE BUMPER.

Application filed June 8, 1925. Serial No. 35,658.

A great many automobile accidents are caused by one machine "side swiping" another, for instance, when two machines are passing either in the opposite or the same direction and one does not relinquish the other's share of the road, or when one machine turns into the roadway or street along which another machine is traveling. Collisions of this nature not only very often result in serious injury to the machines, but are the cause of a great many serious injuries and fatalities to the drivers and occupants of the machines, whether they be ordinary pleasure cars, trucks, or busses.

It is one object of the invention to provide a new and improved form of bumper which is adapted to extend along at least one outer side and preferably both sides of the machine, the bumper being continuous from a point adjacent the front wheel to a point adjacent the rear wheel and having its ends curved inwardly around the wheels, both to deflect blows and to permit proper anchorage of the bumper to the machine. If two machines equipped with such bumpers should side swipe each other, there is very little liability that either one of them would incur any damage, as the bumpers would merely slide along each other until free.

A further object of the invention is to provide a side bumper with guide means for interengagement with a similar bumper on another machine, so that when once the two bumpers are inter-engaged, they cannot become disengaged by relative vertical movement, but must slide one from the other.

A still further aim is to provide for mounting the bumper in such a manner that either of its end portions may be swung substantially to an out-of-the-way position when making repairs on a wheel or tire.

With the foregoing in view, the invention resides in the novel subject matter hereinafter described and claimed, the description being supplemented by the accompanying drawing.

Figure 1 is a perspective view showing the application of the invention to one machine and in dotted lines illustrating another machine in side-to-side collision therewith.

Figure 2 is a partial plan view with portions broken away and in horizontal section.

Figure 3 is a detail vertical sectional view as indicated by line 3—3 of Fig. 2.

Figure 4 is a detail vertical section illustrating the manner in which the bumpers of two machines will inter-engage with each other.

Figure 5 is a diagrammatic side elevation illustrating the manner in which the ends of the bumper may be vertically swung.

In the drawings above briefly described, the numerals 1 and 2 designate the front and rear wheels of an automobile, 3 designates a portion of the chassis frame, and 4 refers to one of the running boards.

One of the improved bumpers 5 is shown extending along each side of the machine from a point spaced laterally from the wheel 1, to a similar point adjacent the wheel 2, the ends of said bumper being curved or otherwise directed obliquely inward as indicated at 6, so that a bumper of one machine may readily engage one of another machine and effect lateral shifting of one or both machines, so that the bumper of one will merely slide along the bumper of the other and the danger of serious accident will be substantially overcome.

The bumper 5 is provided with means extending continuously from one of its ends to the other, to inter-engage with the bumper of another machine, so as to prevent disengagement of said bumpers by relative vertical shifting. In the present showing, the bumper may be considered as formed of steel and it is longitudinally corrugated, so that its outer side is provided with an alternate bead (7) and groove (8) formation. In addition to having the function stated for the corrugations, it will be seen that they effectively reinforce the device.

The bumper may be mounted in any desired manner upon a machine it being understood that proper spacing between the bumper and machine is provided to permit steering. In the present showing, its end portions 6 have their terminals directed in substantially parallel relation with the body of the bumper, as indicated at 9, and these portions are connected detachably by bolts or the like 10, with the chassis of the machine or with other desired parts. The central portion of each bumper 5 is preferably pivotally mounted on a transverse axis. This may of course be accomplished in any desired manner. For illustrative purposes, I have shown the center of the bumper provided with an inwardly extending arm 11 which is received in an appropriate bearing 12 secured to the running board 4. The inner end of the arm 11 may well be provided with a nut 13 or other desired form of stop which limits the outward movement of the arm, said arm however being free to slide inwardly to any desired extent, so that it does not interfere with inward springing of the bumper. Preferably, the arm 11 or other pivotal axis which may be used, declines inwardly as indicated in Fig. 3. Thus, when the ends of the bumper are disconnected from the machine and said bumper is swung to an incline position as shown in Fig. 5, to give access to a wheel of the machine, the end of the bumper which is lowered, will swing outwardly to some extent while it is swinging downwardly, thus moving to a position at which it will not materially interfere with the making of repairs on the wheel or tire.

By employing the general construction herein disclosed, excellent results may be obtained, but it is to be understood that the present showing is for illustrative purposes only, and that within the scope of the invention as claimed, modifications may be made.

I claim:

1. An automobile protector comprising a bumper adapted to extend continously along one side of the machine from a point at the outer side of the front wheel to a point at the outer side of the rear wheel, said bumper having its ends directed inwardly for passage in advance of the front wheel and behind the rear wheel, said ends having their terminals directed in substantially parallel relation with the main portion of the bumper, and in contact with the adjacent portion of a chassis and means for effecting separable connection between the terminals and a chassis.

2. An automobile protector comprising a bumper adapted to extend continously along one side of the machine from a point at the outer side of the front wheel to a point at the outer side of the rear wheel, said bumper having its ends directed inwardly for passage in advance of the front wheel and behind the rear wheel, and means for attaching said bumper, said bumper being provided with guide means extending continously along its outer side to engage a similar bumper on another machine in case one should "side swipe" the other.

3. An automobile protector comprising a bumper adapted to extend continously along one side of the machine from a point at the outer side of the front wheel to a point at the outer side of the rear wheel, said bumper having its ends directed inwardly for passage in advance of the front wheel and behind the rear wheel, and means for attaching said bumper, said bumper being longitudinally corrugated both for strength and to provide its outer side with an alternate rib and groove formation for engagement with a similar bumper on another machine in case one should "side swipe" the other.

4. An automobile protector comprising a bumper adapted to extend continously along one side of the machine from a point at the outer side of the front wheel to a point at the outer side of the rear wheel, said bumper having its ends directed inwardly for passage in advance of the front wheel and behind the rear wheel, and means for attaching said bumper, said bumper embodying means permitting its end portions to be swung vertically to give access to the wheels.

5. An automobile protector comprising a bumper adapted to extend continously along one side of the machine from a point at the outer side of the front wheel to a point at the outer side of the rear wheel, said bumper having its ends directed inwardly for passage in advance of the front wheel and behind the rear wheel, means for detachably connecting the ends of the bumper to the machine, and means for pivotally connecting the central portion of said bumper to the machine on a transverse axis.

6. An automobile protector comprising a bumper adapted to extend continously along one side of the machine from a point at the outer side of the front wheel to a point at the outer side of the rear wheel, said bumper having its endsc directed inwardly for passage in advance of the front wheel and behind the rear wheel, means for detachably connecting the ends of the bumper to the machine, and means for pivotally connecting the central portion of said bumper to the machine on a transverse inwardly declined axis.

7. A safety device for motor busses, trucks and other automobiles comprising a bumper for disposition at the outer side of a wheel of the vehicle and having an oblique portion to extend inwardly at the edge of the wheel, the outer side of said bumper having longitudinal guide means to engage a similar bumper on another machine in case one should "side swipe" the other.

8. A safety device for motor busses, trucks and other automobiles comprising a bumper for disposition at the outer side of a wheel of the vehicle and having an oblique portion to extend inwardly at the edge of the wheel, the outer side of said bumper having an alternate rib and groove formation for engagement with a similar bumper on another machine in case one should "side swipe" the other.

In testimony whereof I have hereunto affixed my signature.

FRANK HORNQUIST.